United States Patent
Schofield

(10) Patent No.: US 7,046,181 B2
(45) Date of Patent: May 16, 2006

(54) $2^N-1$ SHUFFLING NETWORK

(75) Inventor: William G. J. Schofield, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 969 days.

(21) Appl. No.: 09/990,316

(22) Filed: Nov. 21, 2001

(65) Prior Publication Data

US 2003/0095547 A1 May 22, 2003

(51) Int. Cl.
*H03M 1/66* (2006.01)
*H03M 3/00* (2006.01)

(52) U.S. Cl. .................................... 341/144; 341/143

(58) Field of Classification Search ............... 341/144, 341/143; 370/916; 710/51, 69
See application file for complete search history.

(56) References Cited

U.S. PATENT DOCUMENTS

| | | | |
|---|---|---|---|
| 6,456,218 B1* | 9/2002 | Dedic et al. | 341/144 |
| 6,570,521 B1* | 5/2003 | Schofield | 341/144 |
| 6,795,003 B1* | 9/2004 | Wang et al. | 341/143 |

* cited by examiner

*Primary Examiner*—Spe Rexford Barnie
*Assistant Examiner*—Jason Crawford
(74) *Attorney, Agent, or Firm*—Iandiorio & Teska

(57) ABSTRACT

A $2^n-1$ shuffling network includes a shuffle exchange network for receiving $2^n-1$ data inputs and a dummy input and providing $2^n$ outputs; a replacement set of $2^n-1$ data switches for receiving $2^n-1$ outputs from the shuffle exchange network; and a selection circuit for actuating selective ones of the $2^n-1$ data switches in the replacement set to replace one of the $2^n-1$ outputs of the shuffle exchange network with a $2^{nth}$ output of the shuffle exchange network.

14 Claims, 3 Drawing Sheets

$2^n$ Through Path Mapping Table

| | Code | | | S | T | U | V | W | X | Y | Z |
|---|---|---|---|---|---|---|---|---|---|---|---|
| 1 | 0 | 0 | 0 | A | B | C | D | E | F | G | H |
| 2 | 0 | 0 | 1 | B | A | D | C | F | E | H | G |
| 3 | 0 | 1 | 0 | C | D | A | B | G | H | E | F |
| 4 | 0 | 1 | 1 | D | C | B | A | H | G | F | E |
| 5 | 1 | 0 | 0 | E | F | G | H | A | B | C | D |
| 6 | 1 | 0 | 1 | F | E | H | G | B | A | D | C |
| 7 | 1 | 1 | 0 | G | H | E | F | C | D | A | B |
| 8 | 1 | 1 | 1 | H | G | F | E | D | C | B | A |

$2^n$ Through Path Mapping Table

| | Code | | | S | T | U | V | W | X | Y |
|---|---|---|---|---|---|---|---|---|---|---|
| 1 | 0 | 0 | 0 | A | B | C | D | E | F | G |
| 2 | 0 | 0 | 1 | B | A | D | C | F | E | G |
| 3 | 0 | 1 | 0 | C | D | A | B | G | F | E |
| 4 | 0 | 1 | 1 | D | C | B | A | E | G | F |
| 5 | 1 | 0 | 0 | E | F | G | D | A | B | C |
| 6 | 1 | 0 | 1 | F | E | C | G | B | A | D |
| 7 | 1 | 1 | 0 | G | B | E | F | C | D | A |
| 8 | 1 | 1 | 1 | A | G | F | E | D | C | B |

*FIG. 5*

$2^N-1$ SHUFFLING NETWORK

FIELD OF THE INVENTION

This invention relates to $2^n-1$ shuffling network.

BACKGROUND OF THE INVENTION

In a binary segmented system, such as a digital to analog converter (DAC), for example, a unary array of $2^n-1$ elements may be used to represent n bits of an (m+n) bit array. The $2^n-1$ unary element array may be used with other circuit elements of lower bit significance to form the total (m+n) bit array; in such a case the lower significant circuit elements would sum to an approximate equivalent significance as a single element of the $2^n-1$ element unary array. In such systems, shuffling schemes can be used to reduce the effects of mismatch between circuit elements. Where mismatch between a unary array of $2^n-1$ elements is required a scheme for generating only $2^n-1$ unique shuffled outputs is required; a shuffling scheme generating $2^n$ unique outputs when mapped to a $2^n-1$ unary array would have a repetitive sequence causing less than ideal shuffling auto-correlation.

BRIEF SUMMARY OF THE INVENTION

It is therefore an object of this invention to provide an improved $2^n-1$ shuffling network.

It is a further object of this invention to provide such an improved $2^n-1$ shuffling network particularly useful for reducing the effect of mismatch errors in digital to analog converters.

It is a further object of this invention to provide such an improved $2^n-1$ shuffling network which reduces the auto-correlation of shuffling sequence which in turn reduces colored or harmonic noise.

This invention results from the realization that an improved $2^n-1$ shuffling network which reduces the effect of mismatch errors and reduces autocorrelation and concomitant colored or harmonic noise can be achieved using a replacement set of $2^n-1$ data switches for receiving $2^n-1$ outputs from a shuffle exchange network which receives $2^n-1$ inputs and a dummy input and provides $2^n$ outputs and actuating selective ones of the data switches in the replacement set to replace one of the $2^n-1$ outputs of the shuffle exchange network with the $2^{nth}$ output of the shuffle exchange network.

This invention features a $2^n-1$ network including a shuffle exchange network for receiving $2^n-1$ data inputs and a dummy input providing $2^n$ outputs. A replacement set of $2^n-1$ data switches receives $2^n-1$ outputs from the shuffle exchange network. A selection circuit actuates selective ones of the $2^n-1$ data switches in the replacement set to replace one of the $2^n-1$ outputs of the shuffle exchange network with a $2^{nth}$ output of the shuffle exchange network.

In a preferred embodiment the shuffle exchange network may include at least one set of shuffle data switches. Each set of shuffle data switches may include at least $2^n$ data switches. There may be n sets of shuffle data switches. There may be $2^n$ data switches in each set of shuffle data switches. Each data switch in the replacement set of data switches may include a 2 to 1 multiplexer. Each data switch in the set of shuffle data switches may include a 2 to 1 multiplexer. The shuffle exchange network may include a coding circuit for selectively actuating the sets of data switches in the set of shuffle data switches. The coding circuit may actuate each set of shuffle data switches independently. It may actuate all of the data switches in a set of shuffle data switches together. The coding circuit may include a sequence generator for providing each data input at the data output only once each sequence cycle. The sequence generator may include a pseudo random number generator.

BRIEF DESCRIPTION OF THE DRAWINGS

Other objects, features and advantages will occur to those skilled in the art from the following description of a preferred embodiment and the accompanying drawings, in which:

FIG. 5 is a $2^n-1$ through path mapping table showing the transformation of the input to the output using the $2^n-1$ shuffling network according to this invention.

PREFERRED EMBODIMENT

Figure 1:
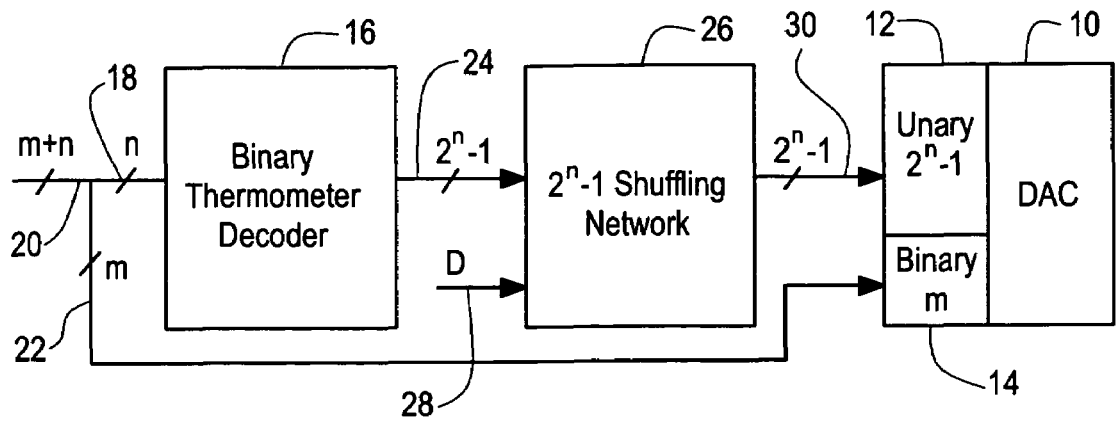
FIG. 1 is a schematic block diagram of a digital to analog converter circuit which has both unary and binary inputs derived from a binary thermometer decoder and using a $2^n-1$ shuffling network according to this invention.

There is shown in FIG. 1 a typical segmented digital to analog converter circuit 10 having a unary input 12 and a binary input 14. The unary inputs are derived from the binary thermometer decoder 16. Binary thermometer decoder 16 receives n inputs at input 18 from an input signal which includes m+n inputs on line 20. The remaining m inputs are delivered on line 22 to the binary input 14 of DAC 10. m may typically be smaller than n but not necessarily. Binary thermometer decoder 16 receives the n inputs on line 18 that produces $2^n-1$ outputs on line 24 to the $2^n-1$ shuffling network 26. One more input, the dummy input D, is provided on line 28 to $2^n-1$ shuffling network 26. The dummy input 28 may typically be a simple fixed or reference signal which may be high or low or zero. The output of $2^n-1$ shuffling network 26 is delivered on line 30 to the unary input 12. While, in the embodiment described hereinafter, binary input 14 includes m inputs, this is not a necessary limitation of the invention. Input 14 may be a unary array or a sub-unary array or any other type of array. Also for purposes of further explanation herein n is 3 and m could be 3 as well.

Figure 2:
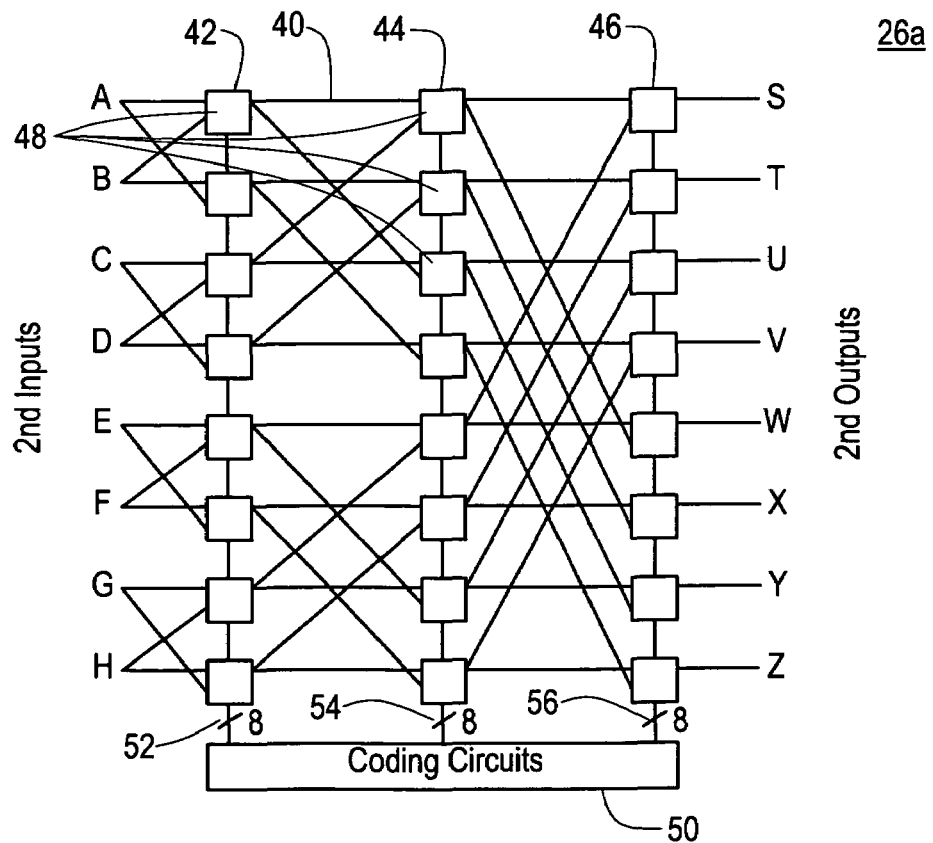
FIG. 2 is a more detailed schematic diagram of a prior art shuffling network.

In prior art shuffling networks 26a, FIG. 2 there is a shuffle exchange network 40 consisting of n sets, in this case three sets, 42, 44, and 46 of data switches 48 of which there are $2^{nth}$ or eight in the specific embodiment where n is 3 in each set. The $2^{nth}$ inputs are labeled A–H. The outputs are S–Z. Also included in shuffling network 26a is a coding circuit 50. In prior art devices coding circuit 50 has three groups, 52, 54, and 56 of eight lines each so that each of the eight data switches 48 in each of the sets 42, 44, and 46 can be operated independently.

Figures 3, 4:
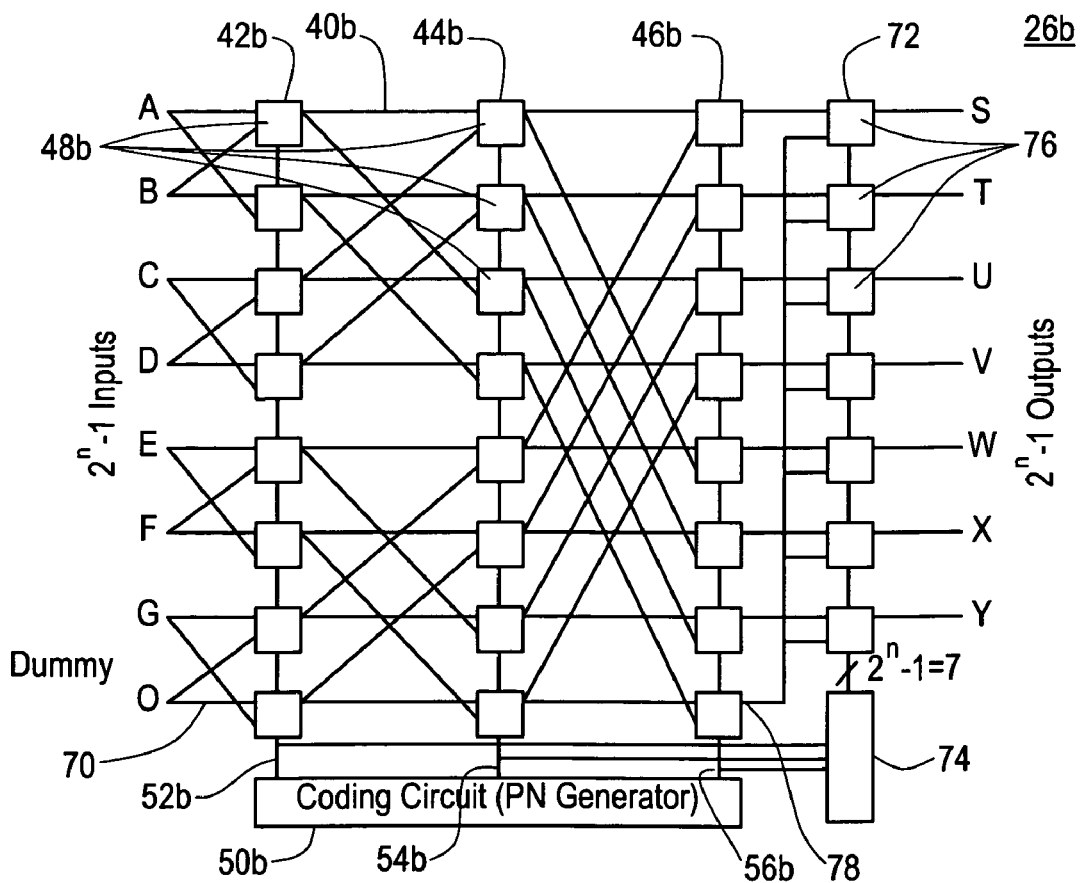
FIG. 3 is a $2^n$ through path mapping table showing the input to output transform of the shuffling network of FIG. 2 when the data switches are operated in sets rather than independently.
FIG. 4 is a view similar to FIG. 2 of the $2^n-1$ shuffling network according to this invention as shown in FIG. 1.

In the realization of this invention it was understood that if, instead of independent operation, all of the data switches within each set were operated globally, together, the input output transform would appear as shown in the $2^n$ through path mapping table, FIG. 3. There it can be seen that coding circuit 50 provides eight coded inputs, numbered 1–8 and in response thereto shuffles the inputs A–H so that they appear in different combinations at the outputs S–Z. For example, with code 1 the inputs appear in the order A, B, C, D, E, F, G, H, at outputs S–Z, respectively. In response to code 2 the inputs appear in the order BADCFEHG at the outputs S–Z, respectively, and so on.

If such a prior art shuffle network 26a were used in place of $2^n-1$ shuffling network, FIG. 1, according to this invention, $2^n$ inputs would produce $2^n$ outputs, not $2^n-1$ outputs. This would cause redundant data and loss of data. In accordance with this invention it was realized that to convert from a $2^n$ input to a $2^n-1$ output, it would be necessary simply to eliminate an output, for example, output Z so that the right-hand most column 60 in FIG. 3 would simply be eliminated. This would of course eliminate all of the data in that column as well, contributing to inaccuracy in the transformation or shuffling. In addition, one of the inputs would be redundant. For example, arbitrarily picking H as the redundant or dummy input, one can see that in each of the outputs S–Y in FIG. 3, throughout the sequence of codes 1–8, the input H appears but the input H is a dummy so no information is contributed by that input. In addition the true inputs A–G that could contribute to the accuracy of the transformation or shuffling have been eliminated with the elimination of output Z, column 60. This invention realizes that each of the occurrences of input H, now a dummy, could be replaced with the real input data which has been eliminated by the elimination of column 60. For example, at code 2 where input H appears at output Y, input G could be substituted. At code 3 where input H appears at X, input F could be substituted. And at code 4 where input H appears at output W, input E could be substituted, and so on through code 8 where input H appears at output S and could be replaced with input A from column 60.

In accordance with the realization of this invention, the $2^n-1$ shuffling network 26b, FIG. 4 can be implemented so that there are $2^n-1$ inputs and $2^n-1$ outputs. In $2^n-1$ shuffling network 26b, shuffle exchange network 40b still includes n sets 42b, 44b, and 46b of $2^n$ data switches 48 in each set. But now instead of input H, dummy input 70 occurs and a replacement set 72 of data switches 76 has been added at the output of set 46b. And a selection circuit 74 has been added to individually control each of the $2^n-1$ data switches 76 in set 72.

In shuffle exchange network 40b, FIG. 4 lines 52b, 54b, and 56b are single lines which operate all of the data switches 48 in each set 42b, 44b, and 46b together, globally, while a coding circuit 50b operates each of the sets independently.

In operation, selection circuit 74 actually includes $2^n-1$, or in this particular case seven lines, one output to each of the data switches 76 in replacement set 72. Coding circuit 50b provides an output on each of lines 52b, 54b, and 56b to selection circuit 74 so that selection circuit 74 is always aware of which coding step, 1–8, FIG. 5, is being currently imposed on shuffle exchange network 40b. In this way selection circuit 74 knows each time an H would appear on a particular data switch 76 in data set 72 and instead replaces that with the inputs A–G from the eliminated column 60 of output Z, which are derived from inputs A–G through the shuffle exchange network 40b and appear on line 78 coincidentally with the actuation of the particular one of data switches 76 that otherwise would be subject to the redundant input H.

Now it can be seen that the transform is indeed from $2^n-1$ inputs to $2^n-1$ outputs and the eight codes in the mapping table of FIG. 5 provide, for each output S–Y, a unique set of inputs A–H. However, there is a duplicated input set. For example, output S includes two inputs A, output T includes two inputs B, output U includes two inputs C, output V includes two inputs D, output W includes two inputs E, output X includes two outputs F, and output Y includes two inputs G. While this is tolerable, even better accuracy can be obtained by removing that redundancy. This can be done, in this particular embodiment, by eliminating code 1, 000 and thereby removing A, B, C, D, E, F, and G coincident with coding 1. This can be done by a sequence generator which provides each data input at the data output only once for each sequence cycle. One sequence generator that works well is a pseudo random number generator which inherently can not produce an all zero output and so automatically eliminates that code.

Another advantage of this invention is that in the implementation shown in FIG. 4, the data switches 48b and 76 can be implemented very simply with a 2 to 1 multiplexer. Although a specific cross point connected shuffling exchange network has been shown, FIG. 4, this is not a necessary limitation of the invention as any desired cross point connection can be used: a local switching or decision making type or a benes, omega, or clos type. This will change the through path on the mapping table, FIG. 5, but the invention still applies. Similarly the coding circuit 50b need not be a pseudo random number generator, it could be simply a register that counts around but does not produce the number 000. Although this embodiment has been disclosed with n=3, this is not a necessary limitation of the invention and in fact the invention's usefulness is proportional to the increase in the size of n; for example, good results have been obtained with an n=7 or greater. Also, although the H input was chosen as the redundant quantity to be made a dummy input, this is not a limitation of the invention. Any of the other inputs A–G could have been used. Further, there is no restriction in the example of having eliminated the output Z as any of the other outputs S–Y could have been eliminated.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. A $2^n-1$ shuffling network comprising:
   a shuffle exchange network for receiving $2^n-1$ data inputs and a dummy input and providing $2^n$ outputs;
   a replacement set of $2^n-1$ data switches for receiving $2^n-1$ outputs from said shuffle exchange network; and
   a selection circuit for actuating selective ones of said $2^n-1$ data switches in said replacement set to replace one of the $2^n-1$ outputs of the shuffle exchange network with the $2^{nth}$ output of the shuffle exchange network.

2. The $2^n-1$ shuffling network of claim 1 in which said shuffle exchange network includes at least one set of shuffle data switches.

3. The $2^n-1$ shuffling network of claim 2 in which each set of shuffle data switches.

4. The $2^n-1$ shuffling network of claim 2 in which there are n sets of shuffle data switches.

5. The $2^n-1$ shuffling network of claim 2 in which there are $2^n$ data switches in each said set of shuffle data switches.

6. The $2^n-1$ shuffling network of claim 1 in which each said data switch in said replacement set of data switches includes a two to one multiplexer.

7. The $2^n-1$ shuffling network of claim 2 in which each said data switch in said set of shuffle data switches includes a two to one multiplexer.

8. The $2^n-1$ shuffling network of claim 3 in which said shuffle exchange network includes a coding circuit for selectively actuating said sets of data switches in said set of shuffle data switches.

9. The $2^n-1$ shuffling network of claim 8 in which said coding circuit actuates each set of shuffle data switches independently.

10. The $2^n-1$ shuffling network of claim 8 in which said coding circuit actuates all of the data switches in a set of shuffle data switches together.

11. The $2^n-1$ shuffling network of claim 8 in which said coding circuit includes a sequence generator for providing each data input at the data output only once each sequence cycle.

12. The $2^n-1$ shuffling network of claim 11 in which said sequence generator includes a pseudo random number generator.

13. A $2^n-1$ shuffling network comprising:

a shuffle exchange network for receiving $2^n-1$ data inputs and a dummy input and providing $2^n$ outputs;

a replacement set of $2^n-1$ data switches for receiving $2^n-1$ outputs from said shuffle exchange network, each said data switch in said replacement set of data switches including a two to one multiplexer; and a selection circuit for actuating selective ones of said $2^n-1$ data switches in said replacement set to replace one of the $2^n-1$ outputs of the shuffle exchange network with the $2^{nth}$ output of the shuffle exchange network.

14. A $2^n-1$ shuffling network comprising:

a shuffle exchange network for receiving $2^n-1$ data inputs and a dummy input and providing $2^n$ outputs, said shuffle exchange network including at least one set of shuffle data switches, each said data switch in said set of shuffle data switches including a two to one multiplexer;

a replacement set of $2^n-1$ data switches for receiving $2^n-1$ outputs from said shuffle exchange network; and a selection circuit for actuating selective ones of said $2^n-1$ data switches in said replacement set to replace one of the $2^n-1$ outputs of the shuffle exchange network with the $2^{nth}$ output of the shuffle exchange network.

* * * * *